US008588484B2

(12) United States Patent
Wang et al.

(10) Patent No.: US 8,588,484 B2
(45) Date of Patent: Nov. 19, 2013

(54) FINGERPRINT MATCHING METHOD AND APPARATUS

(75) Inventors: Li Wang, Coventry (GB); Abhir Bhalerao, Warwickshire (GB); Roland Wilson, Staffordshire (GB)

(73) Assignee: Warwick Warp Limited, Coventry (GB)

( * ) Notice: Subject to any disclaimer, the term of this patent is extended or adjusted under 35 U.S.C. 154(b) by 668 days.

(21) Appl. No.: 12/666,186

(22) PCT Filed: Jun. 19, 2008

(86) PCT No.: PCT/GB2008/050468
§ 371 (c)(1),
(2), (4) Date: Jul. 6, 2010

(87) PCT Pub. No.: WO2009/001121
PCT Pub. Date: Dec. 31, 2008

(65) Prior Publication Data
US 2010/0266168 A1    Oct. 21, 2010

(30) Foreign Application Priority Data
Jun. 22, 2007 (GB) .................................. 0712084.3

(51) Int. Cl.
*G06K 9/00* (2006.01)
(52) U.S. Cl.
USPC ............ 382/124; 382/260; 382/127; 382/115
(58) Field of Classification Search
USPC .................................. 382/124, 260, 127, 115
See application file for complete search history.

(56) References Cited

U.S. PATENT DOCUMENTS

| 6,487,306 B1 | 11/2002 | Jain et al. |
| 2002/0041700 A1 | 4/2002 | Therbaud |
| 2004/0170306 A1 | 9/2004 | Miyazaki |

FOREIGN PATENT DOCUMENTS

EP    0 768 616    4/1997

OTHER PUBLICATIONS

Jain et al: "Filterbank-based fingerprint matching", IEEE-IP, 2000.*
International Search Report and Written Opinion for PCT/GB2008/050468 dated Sep. 4, 2008.
Search Report for Application No. GB0712084.3 dated Oct. 19, 2007.
Jain et al. "Fingerprint Matching Using Minutiae and Texture Features", Proceedings 2001 International Conference on Imagge Processing, ICIP 2001, Oct. 7-10, 2001.
Li et al. "Feature-Level Fusion of Hand Biometric for Personal Verification Based on Kernal PCA", Advances in Biometrics, International Conference ICB Proceedings, 2006.
Ross et al. "A hybrid fingerprint matcher", Pattern Recognition, 2003, vol. 36—pp. 1661-1673.

(Continued)

*Primary Examiner* — Ruiping Li
(74) *Attorney, Agent, or Firm* — Dorsey & Whitney LLP

(57) ABSTRACT

Exemplary embodiments of method and apparatus for processing the images of fingerprints can be provided. For example, aligned images can be subjected to a tessellation process, whereas each image can be partitioned into a number of regions. Within each region at least one parameter associated with the ridges can be measured and stored. Such exemplary parameter can include, e.g., the prevailing ridge orientation, the average ridge separation and the phase of the ridges. The data can be projected and stored in a multidimensional coordinate system, whereas the representations of any two data can be separated by an amount corresponding to the dissimilarity of these data.

20 Claims, 9 Drawing Sheets

(56) References Cited

OTHER PUBLICATIONS

Chen et al. "Kernel-Based Similarity Learning", Proceedings of the First International Conference on Machien Learning and Cybernetics, Nov. 4-5, 2002.

Wetcharaporn et al. "Enhancement of an Automatic Fingerprint Indentification System Using a Genetic Algorithm and Genetic Programming", Applications of Evolutionary Computing Lecture Notices in Computer Science, 2006, vol. 3907—pp. 368-379.

Lee et al. "A Feature Map Consisting of Orientation and Inter-ridge Spacing for Fingerprint Retrieval", Audio- and Video-Based Biometric Person Authentication, 2005, vol. 3546—pp. 184-190.

Munir et al. "Fingerprint Matching using Ridge Patterns", Information and Communication Technologies, 2005.

* cited by examiner

SWEAT PORES

FINGERPRINT MATCHING METHOD AND APPARATUS

CROSS-REFERENCE TO RELATED APPLICATION(S)

This application is a national stage application of PCT Application No. PCT/GB2008/050468 which was filed on Jun. 19, 2008, and published on Dec. 31, 2008 as International Publication No. WO 2009/001121 (the "International Application"). This application claims priority from the International Application pursuant to 35 U.S.C. §365, and from British Patent Application No. 0712084.3 filed Jun. 22, 2007, under 35 U.S.C. §119. The disclosures of the above-referenced applications are incorporated herein by reference in their entities.

FIELD OF THE DISCLOSURE

Exemplary embodiments of the present disclosure relate to fingerprint identification and verification methods. More specifically, the present disclosure relates to methods of aligning fingerprints into a normalized framework (a canonical frame) for enrolment, matching and storage of fingerprint templates.

BACKGROUND INFORMATION

A fingerprint is characterised by smoothly flowing ridges and valleys, characterised by their orientation, separation, shape and minutiae. Minutiae are ridge endings and ridge bifurcations.

Traditionally, fingerprints have been the most widely accepted biometric. The formation and distinctiveness of the fingerprint has been understood since the early twentieth century (see for example Handbook of Fingerprint Recognition, D. Maltoni, et al, Springer 2003).

The science of fingerprints is based on three fundamental principles:
1. Individual epidermal ridges and furrows have different characteristics for different fingerprints.
2. The configuration types are individually variable, but they vary within limits that allows for a systematic classification.
3. The configurations and minutiae details of individual ridges and furrows are permanent and unchanging.

With this in mind, many techniques have been developed so that personal identification can be made using fingerprints and an individual can be identified by searching a database that contain a large number of fingerprint images (templates) that represent those fingerprint images.

Most automatic fingerprint matching algorithms use minutiae information to determine whether two fingerprints are from the same finger. Some techniques use other ridge features (e.g. ridge direction, ridge spacing, ridge shape etc).

Broadly speaking, the process of fingerprint verification/identification involves two phases: (1) enrolment and; and (2) matching.

In the enrolment phase, people's fingerprint image(s) are processed by computer programs and converted into a template. The template is then associated with meta-data of a person's identity (e.g. name, age, sex, address, etc) and stored in a database. During enrolment, acquired fingerprints are stored in a template database, where only those features of the print which are distinguishing, are extracted and represented in some form.

In the matching phase, in verification mode (1:1 matching), a person's fingerprint images will be matched against the template, which belong to the claimed identity, whereas during identification mode (1:N matching), a person's fingerprint images will be matched against all or a subset of templates stored in the database. A matching score may be calculated for each comparison of the test fingerprint to a stored template.

Thus, a newly presented test fingerprint is compared against the set of stored templates and a matching score is returned. Because the test print has to be compared with each stored template, it is necessary to convert it also into the same representation as the template. Then the system can return a score based on how close is the presented (test) print with each template. If this score value is sufficiently high, determined by a user-defined threshold, then a match is declared.

When analyzed at different levels, a fingerprint pattern exhibits different types of features:
1. At a first level, the ridge-flow forms a particular pattern configuration which can be broadly classified as left loop, right loop, whorl, arch and tented arch. These distinctions are insufficient to facilitate accurate fingerprint matching, but are nevertheless useful in categorising and indexing fingerprint images.
2. At a second level, the geometric location of each minutiae on the print is extracted and the relationship of second level details enables individualisation.
3. At a third level, intra-ridge details can be detected, which are essentially sweat pores whose position, shape and distribution are considered highly distinctive.

The third level of analysis is often used manually by fingerprint experts in forensic science when only a partial print can be reliably obtained and the second level data (minutiae) are insufficient to make a conclusive match.

Fingerprint recognition systems can be broadly classified as being minutiae based or correlation based.

Minutiae-based approaches first find minutiae points and then map their relative placement on the finger. A global transformation including rotation, shift and scaling can also be identified during the establishment of correspondence between minutiae pairs.

The correlation-based method uses the global pattern of ridges and furrows and calculates a score based on the correlation result. A transformation matrix can be also identified when the correlation result is at a maximum.

FIG. 2 shows a flow chart showing the steps generally performed by a typical prior art system.

At step one, depending on the application, a fingerprint image is acquired through either scanning an inked print or a live finger. Once the image is acquired into the computer memory or on a hard disk, it is often put through an enhancement process to improve the quality of the ridge pattern. This normally includes contrast enhancement, noise removal, filtering and smoothing. Some of the prior art systems also extract the foreground, i.e. ridge pattern from the background, at this step. At step three, either an image correlation method or a feature extraction process will be employed.

FIG. 3 is a flow chart showing a commonly adopted feature extraction technique proposed in "Adaptive flow orientation based feature extraction in fingerprint images", Journal of Pattern recognition, Vol. 28, no 11, pp 1657-1672 November 1995 and in U.S. Pat. No. 6,049,621.

Firstly, the image is divided into set of blocks and the principal ridge direction of each block is then estimated. A foreground/background segmentation technique is then used to separate the finger part of the image from the background part of the image. At the next step, some binarisation technique is often used to extract the ridge features (labelled as 1) from non-ridge features (labelled as 0). The ridge feature is often more than 1 pixel wide and may contain noisy artefacts. Those artefacts will be removed at the smoothing step and the longer structures are smoothed. At the next step, the smoothed ridge structured is thinned to 1 pixel wide. The location and orientation of the minutiae features are then extracted from the thinned ridge structures. In some systems, a cleanup post-processing step is employed to remove spurious minutiae features.

The fourth step of the matching flow is normally an alignment step. Most of the prior art systems use the minutiae locations or cross-correlation information to identify a global affine transformation to eliminate the geometric variation including shift, and rotation between the query fingerprint and the template fingerprint.

Some prior art systems, e.g. U.S. Pat. No. 6,049,621, describes a method that is able to establish the correspondence between set points in two respective images. The process begins with identifying at least one point in each of the query and template images that correspond, and using this as a reference point. With the information of the location of the reference points and a curved line (thinned ridges) where the points are located, the translation and rotation parameters between the corresponding ridges are then calculated. Further, using the reference points, an index of all possible minutiae pairs between the query and template fingerprint is formed. An iterative process is then employed to identify the transformation (shift and rotation) for each minutiae pair. An alignment score is also calculated for each possible pair, and the pair with the score higher than a pre-defined value is declared as corresponding pairs (pair mate). The advantage of above approach is it can deal with not only a global transformation (shift, rotation and scaling), but also handle the local elastic deformation by calculating the transformation parameter locally. However, the success of this approach is heavily dependent on the quality of feature extraction and ridge detection.

International Publication WO2005/022446 suggested that the location, shape and distribution of sweat pores are highly distinctive and can be used for identification or verification purpose on their own or as supplementary information from minutiae features.

The matching of a password or pin number to another password or pin number involves the comparison of two absolutely defined parameters, facilitating potentially exact matches. The matching of fingerprints or any biometric system, on the other hand, involves the comparison of highly complex functions and is inherently more difficult.

Measurements and matching within biometric systems are subject to two types of errors: a False Match or a False Non Match. The imperfect accuracy of performance is mainly due to the large variability in different impressions of the same finger (intra-class variation), caused by displacement, rotation, partial overlap, elastic deformation, variable pressure, varying skin condition, lighting effects, noise and feature extraction errors. Reliably matching fingerprint images becomes a hard problem when fingerprints from the same finger may look very different, or when fingerprints from different fingers may appear quite similar.

The inconsistency of the extracted minutiae points and ridge structures between the query fingerprint and template fingerprint is caused by several phenomena including:
1. A different area of the fingerprint being scanned between the query and template fingerprint.
2. Irreproducible contact of finger with scanner caused by the result of manual labour, accidents which changes the ridge structure temporarily.
3. Various skin and environmental factors including dry skin, sweat, dirt, humidity, residues left on the glass of scanning devices contribute to the production of low contrast and/or noisy images.
4. The errors/artefacts exists in the feature extraction, ridge detection and thinning process.

The errors and inconsistency of feature extraction and ridge detection is then propagated to the alignment process, which in turn affects the establishment of a correct correspondence.

In the case of minutiae-based methods, for example, it is difficult to consistently extract the minutiae points when the fingerprint is of low quality or the overlapping area between the data and the template is relatively small. The inconsistency of minutiae extraction will impact on both correspondence and identification of the transformation matrix itself.

Correlation-based techniques are particularly prone to noise, scratches, smudges and are computationally expensive.

Thus, the result of fingerprint matching processes is usually imperfect because of noise in acquisition, variation in the contrast, position and orientation of the print and the elastic deformation of the impression of the finger due to varying degrees of pressure that can be imparted by the subject.

Therefore, prior art fingerprint matching systems can frequently comprise a number of steps to accomplish the match: (1) the acquired images are pre-processed to increase the contrast of the ridge structures; (2) features which are discriminating are extracted from the enhanced ridges, i.e. the minutiae; and (3) the minutiae are compared like for like, after an alignment procedure, with the minutiae of the template. Indeed, in prior-art systems, the template representation may simply be the locations, types (bifurcation or ending), and directions of the minutiae. All three steps have to be repeated for each match before a score can be calculated.

As mentioned above fingerprint systems typically include an alignment process, which occurs prior to any matching, ensuring that images are aligned or justified in order to facilitate an accurate comparison of any two images. This alignment process is usually a combination of translations and rotations, which together form transformation parameters which defines the overall alignment. Prior art alignment methods that depend on minutiae features will inevitably fall into a combinatorial problem of two unknowns, i.e. the correspondence between minutiae points and the transformation between the minutiae set. The transformation parameter calculation depends on the correspondence and the establishment of correspondence rely on an accurate estimation of the transformation parameters. Any errors in either estimate will propagate and degrade the accuracy of the subsequent matching.

Furthermore, because the transformation parameter calculation from the prior art systems rely on the comparison between query and template fingerprints, the process has to be carried out in a pair wise fashion. i.e. the alignment process needs to repeated for each comparison between the query prints and all the templates. In identification applications, when the system is trying to find out who the query fingerprints belongs to from a large database, the alignment procedure has to be repeated multiple times until the identity of the query prints is established.

Another draw back of prior art systems is they only use partial information present in fingerprint images, mainly the ridge pattern and minutiae information. Due to the difficulty of consistent detection and establishing correspondence of sweat pores, those permanent, immutable and individual characteristics are ignored by prior art automatic fingerprint recognition systems. Third level features (sweat pores) are manually identified by fingerprint experts in forensic science because it is sometimes only possible to acquire partial prints, and there may be insufficient second level features present. For certainty skin types or manual labourers, the number of minutiae that can be reliably detected is small and often result a failure at the enrolment stage.

Incorporation of sweat pores can thus enrich the features space by a multiple, and when complimented with minutiae, can reduce the fail-to-enroll rate and increase the matching accuracy. However, although third level analyses are thus considerably more accurate, they also require high resolution scanning. In view of the high density of sweat pores, a consistent feature extraction and correspondence between prints can be difficult to achieve. The high scanning requirements (e.g. 1000 dpi above) has prevented widespread application of third level analyses. However, due to the reducing cost and improving technology of high resolution fingerprint imaging devices, such as WO 2005/022446, there is renewed interest in combining sweat pore representations in order to supplement information from the minutiae features and improve accuracy and usability of fingerprints in non forensic applications.

Therefore, in the light of the above, there is a need for a method which overcomes the deficiencies of prior art systems, by eliminating or reducing intra-class variation in a normalized framework, and has the ability to compliment sweat pore information from the minutiae, which then enables a more reliable and accurate fingerprint match.

SUMMARY OF EXEMPLARY EMBODIMENTS

The present disclosure is an image processing method, which can remove the linear and elastic geometric variation and normalize a collection of two dimensional digital images into a common framework (a canonical frame). The present disclosure also provides an image processing method for matching fingerprint images.

One exemplary embodiment of the present disclosure involves the construction of the canonical framework. Another aspect of the present disclosure involves the detection of sweat pore features from the fingerprint images. Another aspect of the present disclosure involves a nonlinear alignment method to correct elastic deformation. Another involves an enrolment procedure and the other aspect of the present disclosure involves a matching procedure.

In one exemplary embodiment of the present disclosure, a method of processing fingerprint images is provided, comprising the steps of, for each image to be processed, justifying the image by translation and/or rotation and partitioning the image into a number of regions, and, for each region of the image, measuring both the prevailing ridge orientation and the average ridge separation and storing said measurement values, and, for all the processed images, projecting the said measured values for each region into a multidimensional first coordinate system and representing the images in said first coordinate system, wherein a representation distance between representations of corresponding parameters of the two images is indicative of the dissimilarity of the corresponding images. The exemplary method may also include the additional step of measuring the phase of the prevailing ridges storing said measured value and including said measured value in the projection of said measured values.

The justifying procedure can comprise identifying the biological center and the biological axis of the fingerprint in the image, setting a common reference point and common reference axis, translating the image so that the biological center of the fingerprint is re-located at the common reference point and rotating the image so that the biological axis of the fingerprint orientation coincides with the common reference axis. If the biological center of the fingerprint in question is not present in the image, the off-image location of the biological center may be estimated using a combination of extrapolation of ridges in the on-image portion of the fingerprint pattern and known patterns of fingerprints.

A periodic wave function, possibly sinusoidal, may be used as a model to simulate that part of the image in the region, whereas the parameters are measured on said model image and/or on said real image. An estimation error can be computed, the estimation error being the difference between parameter measurements on the model and on the unmodelled image. If the estimation error in a particular region exceeds a predetermined threshold, then a further partitioning step may be applied to that region to create sub-regions of the region and the measuring step is applied within the sub-regions.

Images can be represented in a first coordinate system by vectors V corresponding to the measured parameter values of each region of each image, the coordinate system forming a vector space. The variance or visibility of the said representation distance may be enhanced by various techniques. In one exemplary embodiment of the present disclosure, the measurement data is projected into a second coordination system, whereas the representation distance between representations of two images in the second coordinate system is greater than the representation distance between representations of two images in the first coordinate system. In another exemplary embodiment, the variance or visibility can be enhanced by dimension reduction, such as Principal Component Analysis (PCA), whereas at least one dimension is eliminated from the first coordinate system. Eigenvalue/Eigenvector decomposition is used on the covariance matrix C of the original set of patterns, V, to produce Eigenvalues V', where the mean pattern vector $M=E[V]$ and $C=E[(V-M)\{(V-M)\}^T]$.

A variance score can be assigned to each exemplary enhanced system according to the representation distance between the representations, the variance score being indicative of dissimilarity between the representations.

In another exemplary embodiment of the present disclosure, a portion of the dimensions of the coordinate system are excluded from processing and only a non-excluded fraction K of all the dimensions are permitted to be processed, the excluded dimensions being those the elimination of which causes a variance score below that of a predetermined second threshold.

Images can be categorised according to locations of the corresponding representations in the coordinate system. For all images of a particular category of image, a class template image may be determined, this being the mean pattern $M\_c$ for that class, c. Each of the images in the class may be partitioned into a number of regions, region size being based on distance from the core.

If the size of the sub-region is below that of a predetermined second threshold, then the region or sub-region is not partitioned and the transformation parameter is applied without further partitioning.

A transformation to apply to each region of an image may be determined, wherein representations of parameters of a candidate image are compared to representations of corresponding parameters in the same regions of the class template image $M\_c$ and the representation distance between the candidate image representations and the template image is determined to be the region transformation parameter.

A score can be assigned to each comparison of representations according to the degree of similarity between the representations in the regions of the candidate image regions and those in corresponding regions of the class template image. If the score equals or exceeds a predetermined third threshold, the transformation parameter can applied to the parameters in that region of the candidate image, transforming the representations by the transformation parameter. If the score is less than a predetermined third threshold, then a further partitioning step is applied to that region to create sub-regions of the region and the measuring procedure is applied within the sub-regions and the comparison step is repeated.

Further images can be acquired and the stored data and coordinate system may be updated accordingly. The locations and orientation of minutiae may be identified in each justified fingerprint image and stored. Data relating to sweat pores may be identified in each justified fingerprint image and stored, the data comprising at least location, shape and size of the sweat pore. The sweat pore and/or minutiae data may be projected into the coordinate system which is accordingly updated to include representations of these data.

Representations may be grouped into clusters by application of a clustering technique, which may be k-means clustering or an iterative clustering technique wherein the representations are clustered according to the representation distance between them and the relative spread of current clusters.

In one exemplary embodiment of the present disclosure candidate images are compared against stored images in order to identify matches. This may further comprise the following steps: acquiring a candidate image; measuring and storing parameters of the candidate image; projecting measured values into the first coordinate system which is updated accordingly; applying the categorisation, partitioning, transformation identification, scoring and transformation procedures on the candidate image; identifying the locations and orientation of minutiae in the candidate image and projected into the first coordinate system; assigning a probability score to the candidate image, the probability score being the probability that the image will qualify into a predetermined class of images; classifying said candidate image into one or more classes of images according to its probability score in those classes; comparing representations of minutiae data of the candidate image to representations of minutiae data of the template image of the same class; identifying sweat pore data in the candidate image and stored, the data comprising at least location, shape and size of the sweat pore; comparing representations of sweat pore data of the candidate image to representations of sweat pore of the template image of the same class; a matching score assigning step wherein a matching score is assigned to each comparison of representations according to the degree of similarity between the representations in the regions of the candidate image regions and those in corresponding regions of the template image of the same class; declaring a match if the matching score is above a predetermined threshold. The probability assigning procedures further may comprise comparing the candidate image representations to the mean of the predetermined class, and assessing the probability that the image can qualify in that class taking that mean and the spread of the representations within the class. When the assessment indicates that the candidate image does not qualify into the predetermined class, a non-match may be declared.

In a further exemplary embodiment of the present disclosure an apparatus for processing fingerprint images is provided comprising: means adapted to justify images by translation and/or rotation and partition images into a number of regions, and means for measuring in each region of each image at least one of the following parameters: the prevailing ridge orientation; the average ridge separation; the phase, and means for storing said measurement values, and means for projecting the said measured values for each region into a multidimensional first coordinate system and means for representing the images in said first coordinate system, the representation distance between representations of corresponding parameters of two images being indicative of the dissimilarity of the corresponding images. The apparatus can also comprise means to: identify the biological center and the biological axis of the fingerprint in the image; set a common reference point and common reference axis; translate the image so that the biological center of the fingerprint is re-located at the common reference point; rotate the image so that the biological axis of the fingerprint orientation coincides with the common reference axis.

The exemplary apparatus can be adapted to estimate the off-image location of the biological center using a combination of extrapolation of ridges in the on-image portion of the fingerprint pattern and known patterns of fingerprints, if the biological center of the fingerprint in question is not present in the image.

In one exemplary embodiment the apparatus can comprise modelling means for applying a periodic wave function model, such a sinsusoidal function, to simulate that part of the image in the region, whereas the parameters are measured on the model image and/or on the unmodelled image.

The exemplary apparatus can determine an estimation error, the estimation error being the difference between parameter measurements on the model and on the unmodelled image.

The exemplary apparatus can comprise a second partitioning arrangement whereas, if the estimation error in a particular region exceeds a predetermined first threshold, then the second partitioning arrangement applies a second partitioning to that region to create sub-regions of the region and the measuring step is applied within the sub-regions.

In another exemplary embodiment of the present disclosure, the apparatus may advantageously comprise an arrangement for representing images in said first coordinate system by vectors V which correspond to the measured parameter values of each region of each image, the coordinate system forming a vector space.

The apparatus may also comprise an arrangement for enhancing the visibility of the representation distance, which may be a arrangement for projecting the measurement data into a second coordination system, whereas the representation distance between representations of two images in the second coordinate system is greater than the representation distance between representations of two images in the first coordinate system.

Alternatively the enhancement arrangement can be an arrangement for reducing the dimensions of the first coordination system, whereas at least one dimension is eliminated from the first coordinate system, which can be an arrangement for applying Principal Component Analysis (PCA) obtained by Eigenvector/Eigenvalue decomposition.

The apparatus can further comprise a variance score assignment arrangement for, after each enhancement step, assigning a variance score to each enhanced system according to the representation distance between the representations, the variance score being indicative of dissimilarity between the representations.

Advantageously, the apparatus may include means for excluding a portion of the dimensions of the coordinate system from processing and only a non-excluded fraction K of all the dimensions are permitted to be processed, the excluded dimensions being those the elimination of which causes a variance score below that of a predetermined second threshold.

A further embodiment of the present disclosure comprises an arrangement for categorising images according to locations of the corresponding representations in the coordination system and may comprise an arrangement for categorising all images of a particular category of image, the step of determining a class template image, this being the mean pattern M_c for that class, c. The embodiment may comprise means for partitioning each of the images in the class into a number of regions, region size being based on distance from the core. The apparatus may be adapted not to partition the region or sub-region and to allow transformation parameter to be applied without further partitioning if the size of the sub-region is below that of a predetermined second threshold. The embodiment may also comprise means for identifying a transformation, the means being adapted to: compare representations of parameters of a candidate image to representations of corresponding parameters in the same regions of the class template image M_c and determine whether the representation distance between the candidate image representations and the template image is to be the region transformation parameter.

There may also be an arrangement for assigning a score to each comparison of representations, the score being assigned according to the degree of similarity between the representations in the regions of the candidate image regions and those in corresponding regions of the class template image.

The apparatus can be further adapted to apply the transformation parameter to the parameters in that region of the candidate image and transform the representations by the transformation parameter, if the score equals or exceeds a predetermined third threshold. It may also be further adapted to apply further partition that region to create sub-regions of the region and apply the measuring step within the sub-regions and repeating the comparison, if the score is less than the predetermined third threshold.

In another exemplary embodiment of the present disclosure, there is an image acquisition arrangement for acquiring further images and updating the stored data and coordinate system accordingly. This arrangement can comprise a minutiae locating arrangement for identifying the locations and orientation of minutiae in each justified fingerprint image and stored. It may also comprise a sweat pore locating means for identifying data relating sweat pores in each justified fingerprint image and stored, the data comprising at least location, shape and size of the sweat pore. The apparatus can include an arrangement for projecting sweat pore and/or minutiae data into the coordinate system which is accordingly updated to include representations of these data.

In another exemplary embodiment of the present disclosure, there is also a clustering arrangement for grouping representations into clusters by application of a clustering technique, which may be k-means clustering. Alternatively, the technique may an iterative clustering technique wherein the representations are clustered according to the representation distance between them and the relative spread of current clusters.

An exemplary embodiment of the present disclosure further comprises matching means adapted to compare candidate images against stored images in order to identify matches. This can be adapted to: acquire a candidate image, measure and store parameters of the candidate image, and project measured values into the first coordinate system which is updated accordingly. This matching arrangement may comprise means for: applying the categorization, partitioning, transformation identification, scoring and transformation procedures on the candidate image; identifying the locations and orientation of minutiae in the candidate image and projected into the first coordinate system; assigning a probability score to the candidate image, the probability score being the probability that the image will qualify into a predetermined class of images; classifying said candidate image into one or more classes of images according to its probability score in those classes; comparing representations of minutiae data of the candidate image to representations of minutiae data of the template image of the same class; identifying sweat pore data in the candidate image and stored, the data comprising at least location, shape and size of the sweat pore; comparing representations of sweat pore data of the candidate image to representations of sweat pore of the template image of the same class; a matching score assigning step whereas a matching score is assigned to each comparison of representations according to the degree of similarity between the representations in the regions of the candidate image regions and those in corresponding regions of the template image of the same class and declaring a match if the matching score is above a predetermined threshold. In this embodiment the probability assigning arrangement may further comprise an arrangement for comparing the candidate image representations to the mean of the predetermined class, and assessing the probability that the image will qualify in that class taking that mean and the spread of the representations within the class. The assessment arrangement may comprise an arrangement for declaring a non-match when the candidate image does not qualify into the predetermined class, according to the probability assessment.

In a further exemplary embodiment, a computer program product comprises a readable medium containing instructions for implementing the method herein described.

More specifically, the construction of a canonical frame involves: dividing the input image into a set of blocks (regions); using a parametric modelling technique to model the feature of interest within the block, specifically for fingerprint images, it is to model the ridge direction and separation within the block; identifying the intrinsic center and orientation of the image; aligning the direction and separation pattern according to the intrinsic center and orientation of the impression; reducing the dimensionality of the direction and separation pattern by transforming them into a new co-ordinate system; and projecting the reduced vector onto this co-ordinate system.

Another exemplary embodiment of the present disclosure provides a method that extracts the sweat pore information. The method includes the step of: identifying the possible sweat pore locations; modelling the local intensity information around the sweat pore candidates; removing the spurious sweat pores by combining the local intensity information and its relative distance and orientation from the adjacent ridges.

Another exemplary embodiment of the present disclosure provides a method that removes elastic deformation between two images. The method includes the step of: dividing the images into a set of local regions; estimating the transformation parameter between the data (query image) and the target (template image); applying the transformation parameter to each region in the query image and obtaining an alignment error; if the error is sufficiently large, which suggests that there is still an elastic deformation within the region, a sub-division of the region into a set of smaller regions is then carried out and the estimation for each smaller region is repeated; the estimation process will not stop until the error for each region is sufficiently low; applying the final transformation parameters to the corresponding region in the query image and therefore transform it into the template frame.

According to another aspect of the present disclosure, a system of enrolling fingerprint images is provided that includes the steps of: acquiring a fingerprint images, modelling the ridge structures; projecting the model parameter onto the canonical frame; extracting a minutiae set from the image; extracting the sweat pore information; projecting the minutiae information onto the canonical frame; constructing and storing the template for the future use in the matching procedure; and classifying the templates based on their distance in the canonical feature space.

A further aspect of present disclosure provides a method that identifies the query fingerprints from one or more stored templates. The method includes the step of acquiring the query fingerprint images; modelling the ridge structures; identifying the intrinsic center and orientation; projecting the model parameter onto the canonical feature space; calculating the probability that the query image belongs to template class; estimating the elastic deformation between the query print and each mean of the template class when the probability is high enough; applying the global and local deformation to the query fingerprints and normalising it to the mean of the corresponding class; extracting the normalized minutiae information; determining a minutiae matching score by comparing the normalized minutiae information and the information stored in each template within the class; generating an overall score based on a combination of the probability and minutiae matching information; making a matching decision comparing the overall score with a predefined value.

BRIEF DESCRIPTION OF THE DRAWING

The above and other aspects, features and advantages will be understood more fully from the following detailed description of the exemplary embodiment of the present disclosure, which, however should not be taken to be the restriction to the present disclosure, but is for explanation purposes only.

DETAILED DESCRIPTION OF EXEMPLARY EMBODIMENTS

The present disclosure will be more clearly understood from the detailed description and figures of exemplary embodiments given below.

In the following description, well-known functions and operators are not described in great detail to avoid obscuring the present disclosure with unnecessary detail.

In the following section we shall explain a method and apparatus for processing fingerprint images where templates may be converted to points in a feature space that is invariant to presentation of the prints: the space is referred to as a canonical representation, meaning that the fingerprint images are located in a standardised space. Furthermore, the feature space representation may be compact and robust to noise in the acquired images (such as scratches). We also describe a non-linear extension to the space, which allows us to handle elastic deformation of the presented prints. Subsequent passages demonstrate the use of the canonical feature space in complete image processing methods.

An important advantage of the present disclosure is that may be applied exclusively to the model of the ridge structures (their local directions and spacing). Second level ridge features (minutiae) and third level fingerprint features (sweat pores) are not essential to convert the fingerprint into canonical form. This canonical representation is independent of the $2^{nd}$ and $3^{rd}$ level features. Thus it avoids the dilemma of having to establish the location and correspondence of such features between the test and template, while simultaneously estimating the alignment.

Advantageously, in one particular embodiment, the feature space may also be readily partitioned into prints belonging to the first level (pattern types such as arch, whorl etc), thus reducing the computational complexity of any 1:N pattern search.

Construction of the Canonical Feature Space

Figure 1:
FIG. 1 is a diagram showing a digitized example fingerprint images illustrating an intrinsic center (core), orientation, ridge, minutiae and sweat pore.
Figure 2:
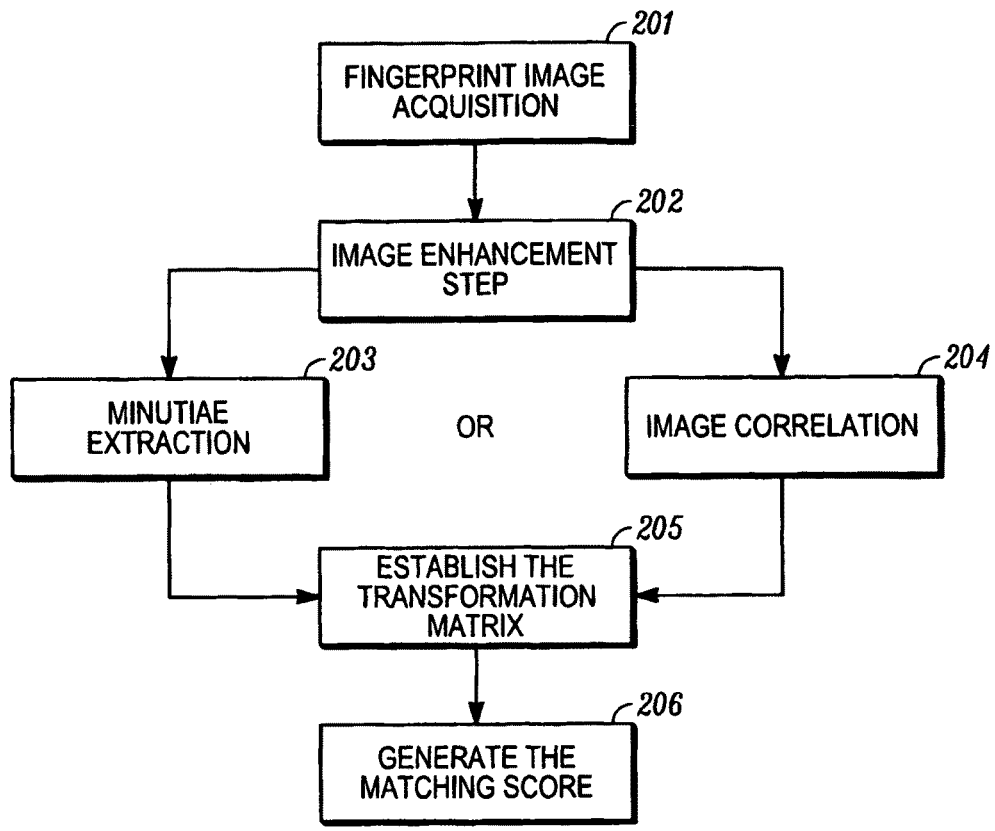
FIG. 2 is a flowchart showing the prior art steps of a typical fingerprint matching system.
Figure 3:
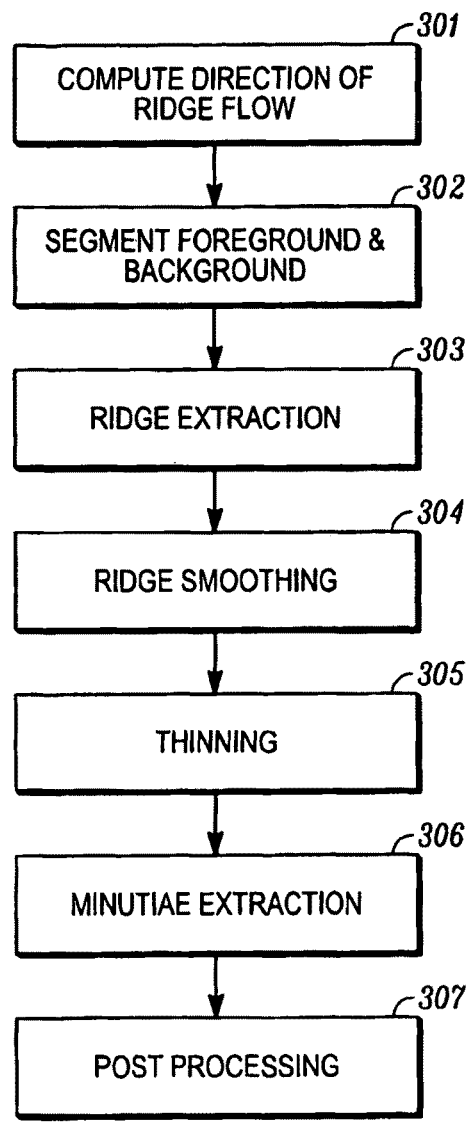
FIG. 3 is a flowchart illustrating the prior art steps of a typical feature extraction method.
Figure 4:
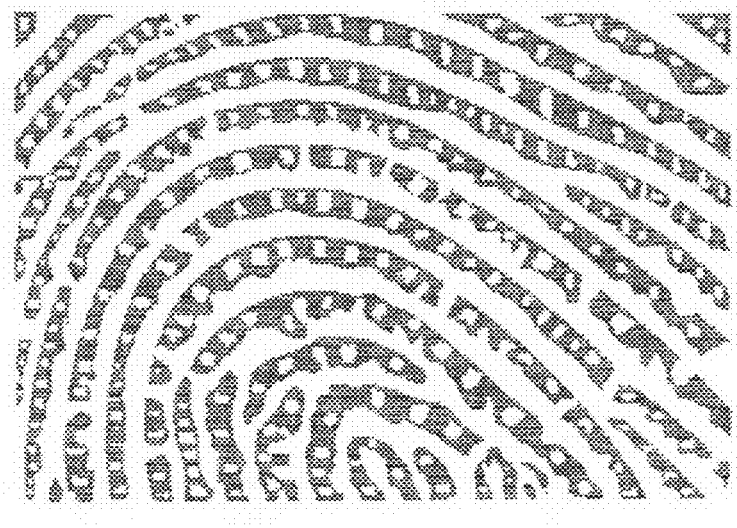
FIG. 4 is a diagram showing one exemplary embodiment of tessellating a fingerprint image using a multi-resolution method.
Figure 5:
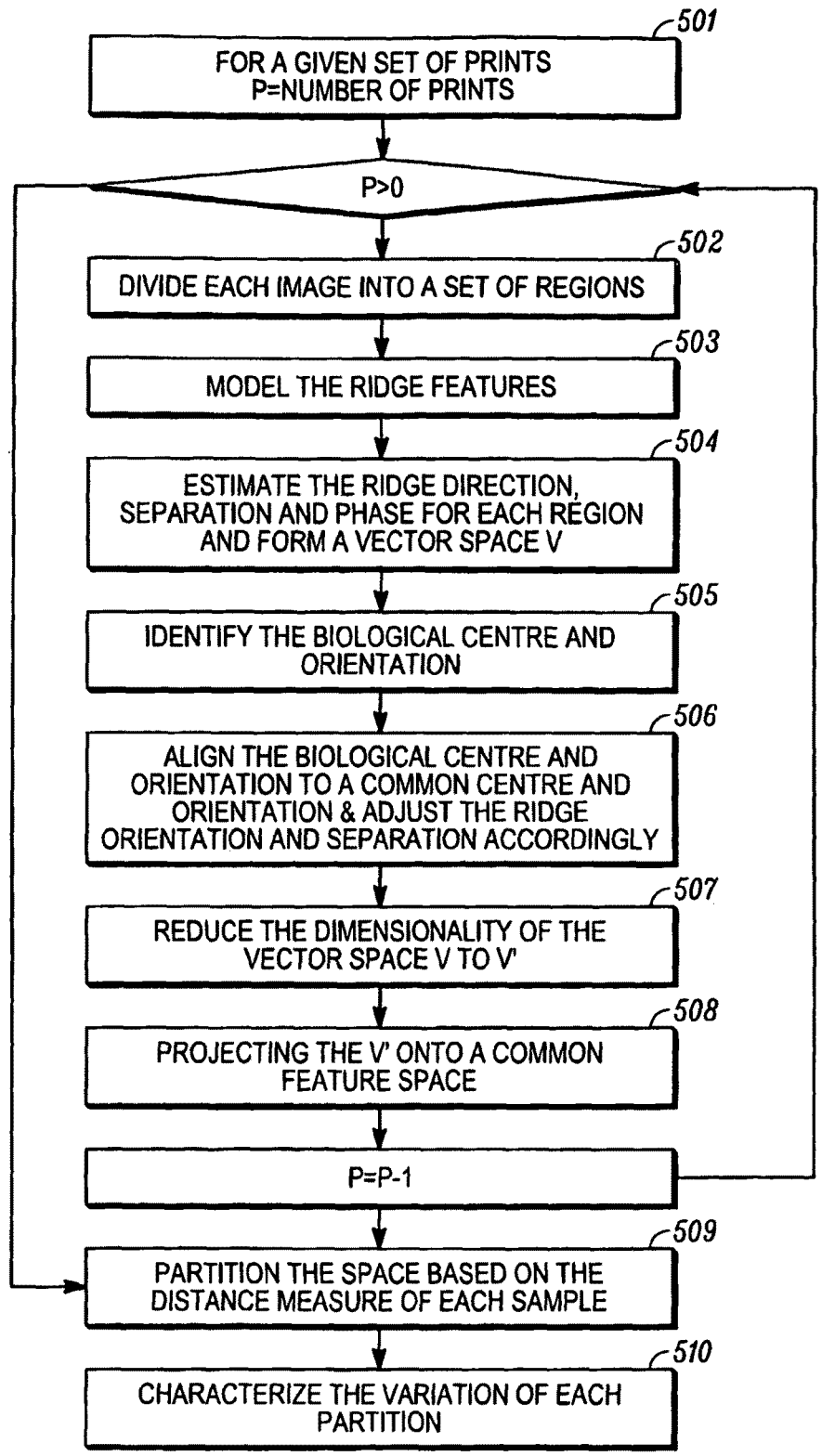
FIG. 5 is a flowchart showing the steps of one exemplary embodiment of constructing a canonical frame using the method of the present disclosure.

According to an exemplary embodiment of present disclosures, FIG. 5 is a flowchart showing the steps of constructing the canonical framework. Prior art studies show that there are limited number of topological configurations of the ridge pattern, such as left loop, right loop, whorl, arch and tented arch. The formation of the feature space can be done in an offline mode i.e. process a collection of pre-stored fingerprint images to construct the initial feature space, or in an online mode where the construction of the feature space proceeds incrementally when enrolling and matching the prints in real time. In both cases, the process begins by using a parametric model to represent the ridge patterns.

According to one exemplary embodiment of the present disclosure, after a fingerprint image is acquired from a scanning device or a stored template, a hierarchical tessellation technique is used to divide image into a set of blocks (step 502), a parametric model is then used to model the ridge segments for each block (step 503). The blocks may be square, although any convenient partition of the image may be chosen.

For each block of the image, an estimate of characteristic parameters of the periodic ridge pattern within the block is derived by modelling the pattern to a suitable modelling functions. In an exemplary embodiment, a sinusoidal model is adopted to represent the local ridge features, although other periodic smooth wave function can be used as the mathematical model. By fitting the model to the image an estimate of the parameters of the pattern can be derived from corresponding measurements on the model. The orientation and frequency of the model can be estimated by many alternative techniques (step 504). Thus, in an exemplary embodiment, each block is transformed to the frequency domain and the orientation and frequency of the signal can be estimated by locating the peak of the magnitude spectrum. The ridge pattern within the block may then synthesized using the sinusoidal model with the estimated parameter of frequency and orientation. In an exemplary embodiment, the phase of the ridge segments is also estimated, by calculating an inner product between the data and the synthesized model.

In one exemplary embodiment of the present disclosure an estimation error can also be calculated be comparing the synthesized model and the real data. The error may vary from region to region, as a result of non-uniform effects, such as displacement, rotation, partial overlap, elastic deformation, variable pressure, varying skin condition, lighting effects, noise and feature extraction errors, as indicated earlier. The error may be estimated for each region: in regions where the error is higher than a predetermined level, this may be considered as an indicator that the data in the region is too complex to be estimated by the current model. Where this occurs the region can be sub-divided into a set of smaller regions. Step 504 may be repeated until all the regions of the image are modelled and all the modelling error is lower than a pre-determined level in each region.

Steps 505 and 506 are centering and alignment steps: these aim to re-center the biological center of the fingerprint with the image's geometric center and to re-align the fingerprint orientation with a general axis. FIG. 5 illustrates these as occurring after Step 504, but these may also take place before Step 504. A fingerprint core (intrinsic center) is an area located within the innermost ridges. Normally it is located in the middle of the fingerprint, however, depending on the scanned area, it might not be positioned in the middle of the image, or indeed might not even present in the image. When the core is present in the image, it can be detected by many alternative techniques. In an exemplary embodiment of our invention, a set of circular symmetric functions is used to locate the location and orientation of the core (step 505). One exemplary embodiment is to convolve the spacing/direction values of the local regions represented by a 2D array of vector values (s, d) with a 19×19 vector valued filter kernel which is circular symmetric and has values (i, j), $-9<=i, j<=9$. The output of the convolution is taken as the sum of the absolute values of the dot products of the (S, D) image and the kernel (I, J). The image position of the maximum value is taken as the nominal intrinsic center. The principal orientation of the print is estimated by the modal value of a histogram of the directions (D) in circular region around the center of radius 96 pixels. The center (x, y) of the core and the principal direction P are stored for the print.

When the core is not present, its position can only be estimated by convolution (step 505) with respect to a representative template prototype of each partition (step 509). This prototype pattern is the mean of a population of learnt templates. The output is therefore one or more core locations (x, y) and principal directions P each of which are subsequently characterized (step 510).

Once the orientation and location of the intrinsic center (core) is located, the collection of estimated ridge directions and separations are shifted and rotated with respect a common origin (core) and principal orientation (step 506).

In a typical fingerprint image, there are around 3000 regions, although it may vary greatly depending on the scanning device and the fingerprint size. The parameters measured in each region may be represented by a three dimensional vector corresponding to the derived estimates of ridge orientation, separation and phase from the mathematical modelling of the ridge pattern in Steps 503 and 504. The total dimensions of the pattern vector for all regions of each complete fingerprint may be of the order of hundreds or thousands, each finger print being represented by a collection of regional vectors. By duplicating this mapping process for each vector group of each fingerprint, the entire set of stored fingerprints may be regenerated in a corresponding vector space within a multi-dimensional coordinate system.

The matching process (not part of FIG. 5), whether verification or identification, is essentially a comparison between two fingerprints (see earlier). In the context of a vector space the comparison between prints requires a distance measure between the collection of vectors for each print. This involves calculations in a vector space of very high dimensions, which requires considerable computing capacity, which may be inefficient and expensive.

One of the objects of the present disclosure is that it advantageously lowers the computation requirement to within normal computing capacity. In an exemplary embodiment of the present disclosure the dimensionality of the feature space may be reduced by various techniques (step 507), the collection of vectors is projected into a new co-ordinate system such that the greatest variance by any projection of the data comes to lie on the first axis (call the first principal component), the second greatest variance on the second axis, and so on.

In an exemplary embodiment of the present disclosure a technique known as Principal Component Analysis (PCA), is applied to the fingerprint vector space to reduce the dimensions to a manageable level and thereby to facilitate analysis of the fingerprint vectors therein. To describe the implementation in more detail, each aligned pattern feature vector is averaged to produced a mean pattern vector, $M=E[V]$. The covariance of the pattern vectors, $C=E[(V-R)(V-M)^{\wedge}T]$, which is the expected values of the outer products of the difference of the patterns from the mean, V−M, is calculated, ^T being the transpose of the vector or matrix and E[ ] the expectation operator. Then a new set of principal feature directions, V', is obtained by PCA. The set of eigenvalues of the eigenvectors produced by the PCA, E, then form the basis set of the canonical feature space.

The feature vectors V' may be made compact by only taking a subset which encapsulate some percentage, K, of the variation, e.g. K can be reasonably set to be 95% of the total variation. $V'=(E1, E2, E3, E4\ EK)(a1, a2, a3, a4, aK)^{\wedge}T$, where a1 . . . aK are a set of scalars, and E1 . . . EK are the unit length eigenvectors of the covariance matrix C (^T is the transpose as before). K is selected in step 507 such that the total variation is less than some percentage e.g. 95%. The scalars a1 . . . aK are calculated in the standard way by measuring the projection or V on the said eigenvectors, i.e. $aj=V^{\wedge}T\ Ej$, for the jth scalar and jth eigenvector.

In another embodiment of the method according to the present disclosure, the unsupervised mode, the system may use the successful matches to learn and update the parameters of the stored template (its mean and covariance in the canonical feature space). The more data that is learnt by the system, the better it will be at distinguishing prints: the inter- to intra-class variability can be better maximized using a classifier such as Linear Discriminant Analysis (LDA) or a non-linear kernel learning method, such as kernel LDA.

The aligned vectors, which represent each fingerprint image, can thus be projected onto a vector space V and thereafter, using the above dimension reduction techniques or other alternative techniques, onto a common feature space V', which is invariant to the presentation of the print (step 508).

After processing all the images either in an offline mode or online mode, each image will be presented as a point in the reduced feature space. Depending on the dimension reduced, different variations between points may become apparent, thereby enhancing or suppressing similarities between points.

An advantage of the present disclosure is that by projecting values of fingerprint parameters, measured region by region, into a fingerprint space containing, for example vectors, representing those parameters, the data can be processed flexibly Enhancing the data by the methods indicated above, such as dimensionality reduction, allows the user to bring out or diminish similarities between fingerprints in a way vastly more convenient than any prior art techniques.

By grouping points according to their location in any particular reduced dimension space, proximity between points may be utilised as a proxy for parameter similarities. Many clustering techniques can then be applied to partition the space of prints (step 509). One method is k-means clustering, which is a two step procedure: each template is first associated or labelled to the closest prototype of an initial set of M cluster prototypes; the locations of these prototypes is then updated by moving to the current labelling. Another iterative method is to use both the distance between templates and the relative spread of the current set of clusters. In another method, the clusters are discovered by hierarchical grouping into larger and larger clusters. In some methods, the number of clusters M may be input to the algorithm, or they may be discovered, as is the case of certain hierarchical agglomeration clustering methods.

As can be appreciated, the present disclosure offers the advantage of managing a large and highly complex data set. By projecting the data associated with regions of the fingerprint into a canonical feature space, i.e., a representative multidimensional coordinate system, the data can be manipulated more conveniently and dissimilarities between images brought out more easily. The effects of noise, scratches may be eliminated relatively easily in the canonical feature space.

Another further advantage of the exemplary embodiments of the present disclosure as proposed is the non-reliance on minutiae and sweat pores, which, in many prior art systems, are essential for achieving any degree of accuracy in measuring or matching fingerprints—the present disclosure disclosed may indeed be combined with data related to sweat pores and minutiae, but in its simplest form is independent of these.

These components (steps) of constructing a canonical feature space could be implemented using alternative techniques. These alternative combinations are within the contemplation of the inventors.

Detecting the Sweat Pore Information

Figure 6:
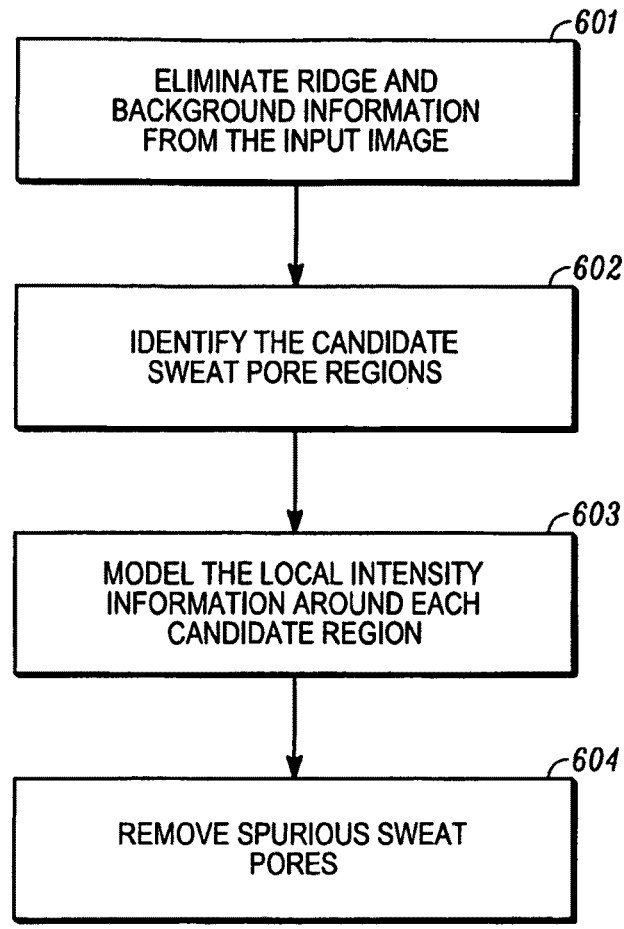
FIG. 6 is a flowchart showing the steps of one exemplary embodiment of extracting and modelling sweat pore information using the method of the present disclosure.

WO2005/022446 suggested that the location, shape and distribution of sweat pores are highly distinctive and can be used for identification or verification purpose on their own or as supplementary information from minutiae features. According to an exemplary embodiment of one aspect of present disclosure, FIG. 6 is a flowchart showing the steps of detecting the sweat pore information. Using the steps previously proposed (step, 502, 503, 504), ridge patterns can be explicitly represented by some periodical mathematical model. The ridge information can thus be removed from the original image by subtracting the reconstruction of the ridge pattern from the original data (step 601). The residual information will contain sweat pores and other background feature noise. The generic profile of sweat pores is believed to be round (blob) shaped type of features and generally have higher intensity values than the background, however, their size and shape can vary and sometimes the boundary can be highly irregular. A consistent and robust identification of sweat pore features is therefore challenging.

In one exemplary embodiment of present the present disclosure, a 2D Hermite polynomial is used to model the sweat pore features. The candidate or putative region is first identified by locating the pixels with high intensity values, a window is placed around those pixels and are then labelled as a candidate or putative region (step 602). In the next step of the embodiment, a parametric model is use to represent the putative pore in each region. (step 603). In one exemplary embodiment of the present disclosure, the original data within the region is first modelled by a 2D Gaussian intensity profile where the parameters, i.e., mean and co-variance of the intensity model, can be estimated using an iterative maximum likelihood method. An alternative embodiment is to use a Minimum Mean Square Error technique to estimate the parameters. Both techniques are obvious to the skilled people in the art. The Gaussian profile can very accurately model the round shape features, however it is insufficient for features with irregular shapes. The use of a Hermite polynomial is to increase the flexibility of the model and therefore improve the modelling accuracy. In an exemplary embodiment, only the first few Hermite coefficients are used to represent sweat pore features.

For example, it is possible to use some or all the features identified and modelled at (step 603) for matching fingerprints, however, many other background features including, scanning noise, dirt or oil on the either skin or scanner surface etc will also produce pore like features. To improve the consistency of pore detection, a filtering step (step 604) can be provided for an exemplary embodiment of the present disclosure.

A filtering of the putative pores based on their shape can be applied. In an exemplary embodiment, the covariance of the Hermite polynomial parameters estimated in the pore modelling step 603 are analysed using Principal Component Analysis. The principal modes that encapsulate some proportion of the total variation, e.g. 90% or 95%, are used to filter out pores that have projections of their Hermite polynomial coefficients that lie outside the chosen region of variation in the feature (shape) space calculated by the PCA. A user-defined threshold can be used to control the strictness of the shape filtering which results. This particular embodiment is a linear method of filtering unlikely shape differences, but the present disclosure does not exclude the use of non-linear shape modelling techniques such as kernel PCA.

In secondary filtering step, the location of the pores are considered in relation to the ridge patterns of the impression (step 503). Firstly, only putative pores that overlap with the ridges are considered. For the exemplary embodiment, those putative pores whose nominal area significantly overlaps a ridge are passed on to the next filter; those that do not are removed. The second location filter considers those pores that lie more or less on the center line of the ridge (along the direction of the ridge). A small variability in position perpendicular to the ridge direction is allowed in proportion to the nominal ridge spacing is allowed. This is a predefined parameter. The next location filter considers the relative frequency of the pores along the entire ridge and a harmonic expansion of the pore locations along the ridge (along the arc length of the ridge center line) is used to determine the fundamental periodic frequency. Pore locations at higher harmonic frequencies are deleted. The fundamental frequency can be learned using similar, high quality impressions, or learnt from the current impression. In the exemplary embodiment, a Fourier analysis of the 1D signal of putative pore positions along the arc length can be used to perform the harmonic analysis.

In the exemplary embodiment, these pore shape and pore location filters may be applied in this order, although other combinations of ordering can be envisaged. In the exemplary embodiment, both shape and location filters can be used, but whether both are applied will depend on quality of the acquired images and the proportion of the artefactual to true pores detected at steps 601 and 603.

Image Alignment

Image alignment removes the geometric variation among prints that is caused by scanning the fingerprint images acquired at different angles and displacements on the scanning device. As described above, prior art systems align the fingerprint images based on the minutiae information, which inevitably fall into a combinatorial problem of two unknowns, i.e. the transformation between the minutiae set and the correspondence between the minutiae points.

An exemplary image alignment according to the present disclosure may be based on the previously mentioned ridge parameters and may therefore be independent of minutiae distributions. In addition to the global transformation, the alignment method of the present disclosure, as described below, can advantageously also remove the elastic deformation caused by scanning distortion, uneven downward pressure when the fingerprint is placed to the scanning surface, twisting and various other factors. Under prior art minutiae alignment techniques, such deformations and distortions are difficult to accommodate in a systematic way and can lead to inaccuracies.

Figure 7:
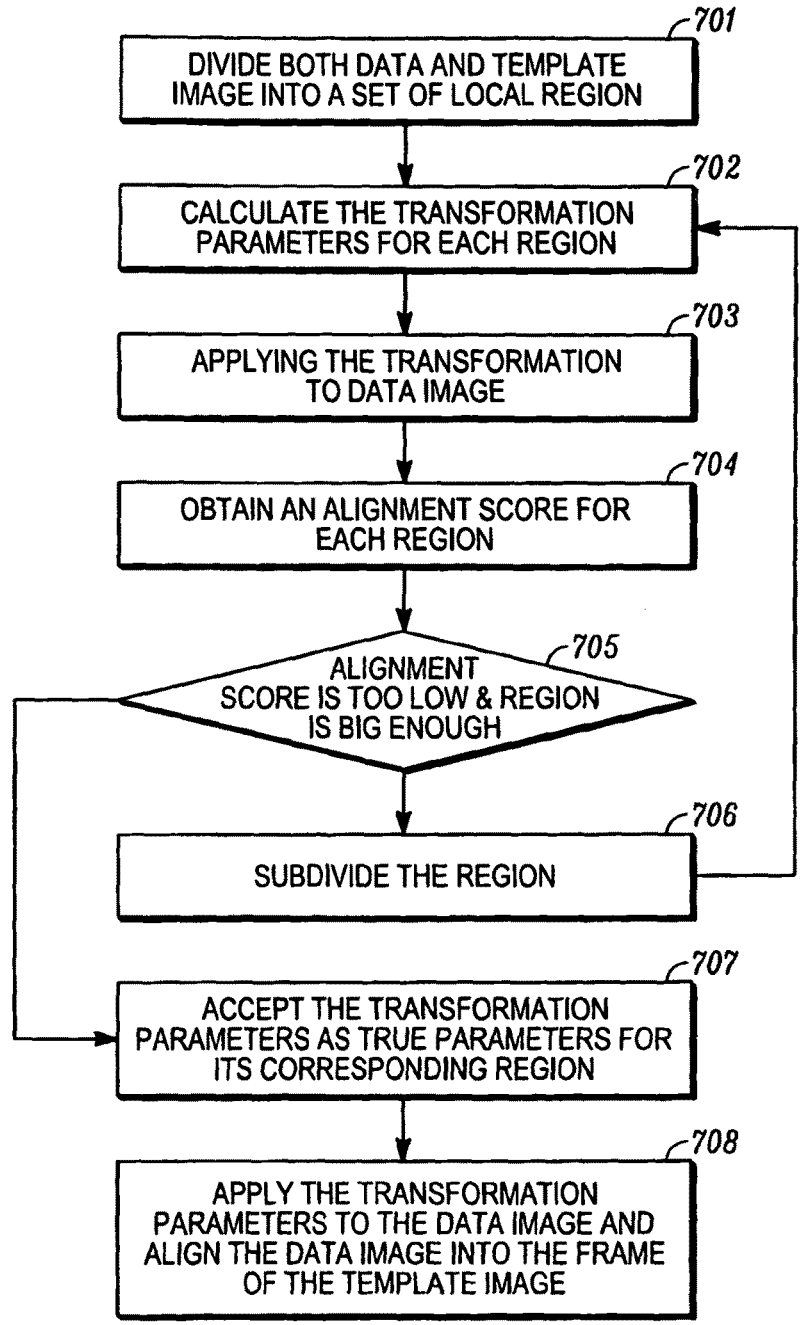
FIG. 7 is a flowchart showing the steps of one exemplary embodiment of a nonlinear alignment process using the method of the present disclosure.

FIG. 7 is a flowchart showing an exemplary embodiment according to the image alignment method of the present disclosure. According to one exemplary embodiment of the present disclosure, the two input of FIG. 7 are representations of a query image and the mean of the class the query image belongs to. According to an exemplary embodiment of the present disclosure, the two inputs of FIG. 7 is a representation of query image or candidate image and a representation of a image template that has previously been enrolled. This latter implementation is an exemplary embodiment for 1:1 matching (verification). In both embodiments, the representation of the image is the multidimensional feature set {separation, direction and phase} generated by using (step 501-506).

At step 701, the candidate and stored template may be tessellated, thereby creating a number of regions for each image. The feature set for each input is grouped into a set based on its relative position to the core location. Each group will represent a region of the image. The size of the region may thus be dependent on the distance from the core.

The goal of step 702 is to estimate the transformation parameters {scale, rotation, shift} to be applied to each group (region) to offset the deformation and distortion processes indicated above. According to an exemplary embodiment of the present disclosure, a recursive filtering technique is used to estimate the transformation parameters, this being the transformation to be applied to each region. The candidate image is essentially compared to a template representing a given class of images, with which the candidate image is associated. The representation points for each region of the candidate image are compared to the corresponding representations in the same regions of the class template, the difference between them being indicative of the transformation required to eliminate the distortion in that particular region.

The estimation of the transformation process is an iterative process, with a prediction and update step at each iteration. The prediction step is based on the estimates at previous iterations and the updating is based on the error in the new measurement, according to the prediction. The above implementation may be considered to have converged when the difference between the estimate at the previous and current iterations is sufficiently small. According to the above implementation, optimal transformation parameters that best align two corresponding regions in query and template images are thus obtained.

The estimated transformation parameters are then applied to the corresponding regions of a query image to align the region to the corresponding one in the template (step 703). An alignment score for each region is then calculated at the next step (step 704) by comparing the similarity between the corresponding region in a template image and aligned query image. If the alignment score is not high enough, it suggests that there is still some elastic deformation within the region and it should thus be divided into a number of smaller regions and steps (702-704) are repeated until the alignment score for each region is high enough or the number of data too few to carry out the recursive calculation at step 702. Once all subgroups (regions) are processed, the transformation parameters for both global and elastic deformations are obtained by interpolating the transformation parameters estimated for each region (step 707). The interpolated transformation is then applied to the query image and aligned it to either the mean of the class or the individual template depending on the implementation.

The advantage of the alignment system according to an exemplary embodiment of the present disclosure is that distortions in the fingerprint image, due to excess or uneven pressure during extraction, finger roll etc (as described earlier), may be compensated for more easily than in prior art systems. The subsequent tessellation, whereby further partitioning into subregions occurs, according to the distance of the region from the core of the fingerprint, permits greater accuracy in modelling the areas of the print most likely to be subject to such distortions. The improvement in alignment enhances the normalisation effect throughout the data set and minimises the chances of, for example, a mismatch of two images of the same finger.

Enrolment

Figure 8:
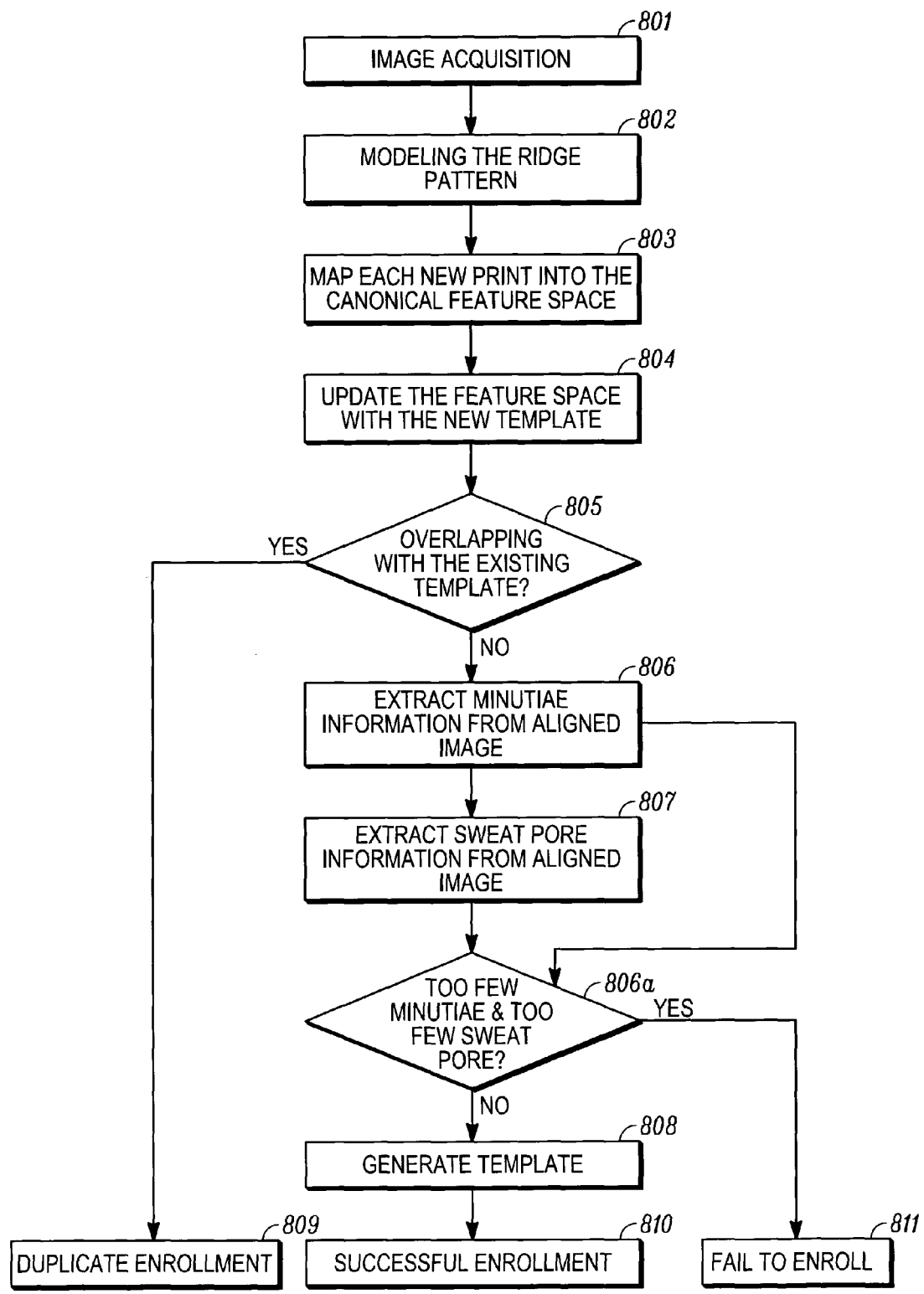
FIG. 8 is a flowchart showing the steps of one exemplary embodiment of extracting and modelling sweat pore information using the method of the present disclosure.

Fingerprint recognition systems have two principal modes of operation: enrolment and matching. During enrolment, acquired fingerprints are stored in a template database, where only those features of the print that are distinguishing are extracted and represented in some form. FIG. 8 is a flowchart showing an exemplary embodiment according to the enrolment mode of the present disclosure.

The enrolment process according to an exemplary embodiment of the present disclosure starts from acquiring a fingerprint image from a scanning device (step 801). At the next step (step 802), it is then divided into a set of regions (step 502) and the ridge pattern of each region is modelled, according to previously described methods (at step 503) and the ridge orientation and separation of each region is estimated. The location and orientation of the core is also located the same way as described at (step 505). The parameter set {separation, direction} is then projected to the canonical feature space as suggested at FIG. 5.

In an exemplary embodiment of the present disclosure, if the location of the projected pattern overlaps or is very near to a existing pattern from a template enrolled previously, then step (809) is carried out and a duplicate enrolment is declared, i.e. the fingerprint has already been enrolled in the database. Otherwise, the feature space is updated with the new candidate and the classification and clustering steps (509, 510) will also need to be re-calculated with the information from the new image. At the next step (806), the minutiae information, i.e. the location, orientation and ridge count may be extracted from the enrolment image. This information may be also aligned to the canonical feature space. Step 807 is an optional step and it is to extract the pore information from the input image. The information includes the location, shape and distribution of sweat pore features. A detailed embodiment is given above and shown in FIG. 6. If the number of detected minutiae and the number of detected sweat pores are lower than a predefined value, which is configurable by the end user, step 811 is performed again and an enrolment failure is declared. Otherwise, the location of the image in the canonical feature space, the information of which class and sub-class it belongs to, the ridge parameters, the location and orientation of its core, the minutiae and sweat pore information are encoded and stored as a template image. To maintain the interoperability of the template, it can be generated in a multi-layer fashion so that any part of the information can be used by any foreign method or computer program that can only utilize that part of the information, such as location, type and/or the orientation of the minutiae.

Matching

Figure 9:
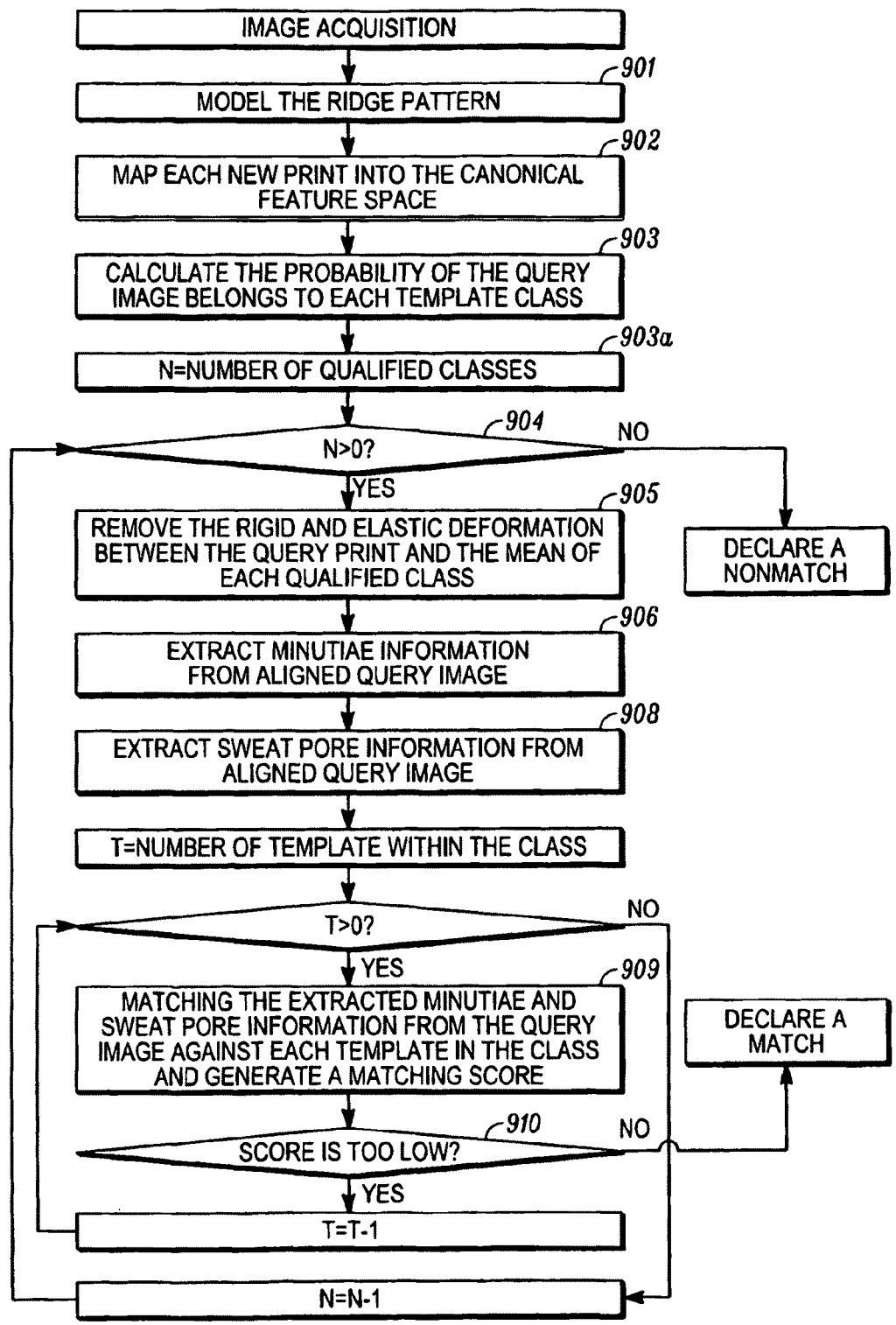
FIG. 9 is a flowchart showing the steps of one exemplary embodiment of identifying the query fingerprint image against one or more stored templates using the method of the present disclosure.

The exemplary process of fingerprint matching involves comparing a query print with a set of one or more template prints. There are primarily two modes in this part of the process: a verification mode, i.e. a one to one match is sought and; an identification mode, i.e. a one to many match is sought. The following disclosure is based on the identification mode, however, with only a slight modification of the flow, the implementation can be easily adapted to the verification mode. FIG. 9 is a flowchart showing an exemplary embodiment of present disclosure.

After acquiring the image (query) from the scanning device, it can be divided into a set of local regions and each region is modelled and ridge information is identified (step 901) and further mapped into the canonical feature space (step 902). Both steps use the same methodology as the one explained in the enrolment process. At step 903, based on its position in the feature space, the probability that the query image belongs to certain class and sub-class is calculated. The probability of membership of a given query print, Q, belonging to a particular class, c, can be expressed as the posterior probability $P(c|V(Q), M\_c, C\_c)$, where $M\_c$ is the mean of pattern class c and $C\_c$ is the covariance of pattern class c. $V(Q)$ is the projection of Q into the canonical feature space V (step 508). In one exemplary embodiment, the probability can be obtained without taking into account the spread of each pattern class, $C\_c$ (i.e. its covariance). Then, the probability can be based simply on the Euclidean distance, e.g. $P(c)=Exp[-\|V(Q)-M\_c\|]$, $Exp[\ ]$ is the exponentiation function and $\|.\|$ the Euclidean vector norm or distance. Otherwise, to take into account the spread of each class, a probability model, such a normal or Gaussian distribution, can be assumed. Then the posterior probability is a quantity calculated from a Gaussian probability distribution function, e.g. $Exp[-(V(Q)-M\_c)^T C\_c^{-1}(V(Q)-M\_c)]$, where T is the transpose and $C\_c^{-1}$ is the inverse of the covariance matrix $C\_c$. Such a formulation is familiar to experts in pattern classification. The actual embodiment of step 509 will suggest other ways to calculate the membership or classification probability: $P(c|V(Q), H\_c)$, where this time $H\_c$ is a set of parameters under a different probability model for the distribution of patterns in the class c. The choice of probability model, whether parametric or non-parametric, may be connected with the partitioning process used at step 510. Such variations are under the contemplation of this invention.

If there is no qualified class, step 914 is performed and a non-match declared. Otherwise the system can proceed to step 905. At this step, for each qualified class, the ridge parameter set of the query image is compared with the mean parameter set for each class. And both linear and non-linear deformation between the two parameters is removed using a method described at image alignment step. The estimated transformation parameters are then applied to the query image.

At step 906, the minutiae information can be extracted from the aligned query image and compared with the corresponding information in each stored template within the partition class. If the number of minutiae is two low, then algorithm may proceed to step 908, which extracts the sweat pore information (explained in detail at the description of FIG. 6). If there are sufficient minutiae present at step 906, the query and stored templates are compared and a matching score is generated purely from minutiae and the probability, step (909). Otherwise the sweat pore information is used to compare the query and the corresponding information in each template within the class.

A combined matching score (909) can be then generated with the combination of the probability measurement calculated at step 903, minutiae and/or sweat pore information. In an exemplary embodiment, the two scores: one that expresses the 'belonging to the nearest patter class c' and; the other expressing the similarity of the minutiae/sweat pore patterns between the query print Q and each template R_c in class c, are combined by taking the product of the two scores expressed as probabilities. Thus, let $P(Q\ matches\ R\_c)=P(c|V(Q), H\_c) \times P$ (minutiae score of Q and R_c). The first probability is the same as estimated in step 903, and there are many known ways in which a similarity score based on minutiae and/or pore locations can be readily expressed as a probability. If any of the matching score within the class are higher than a predefined threshold, the system will declare a match between the query image and corresponding template. Otherwise, step 905 is returned to and the templates within another qualifying class are processed. In the exemplary embodiment, the order of processing subsequent qualifying classes (and the templates contained within) is determined by taking the largest of the 'belonging' scores calculated at step 903 first. When all the templates in all the qualifying classes have been compared against the query image, and none of the matching scores are higher than the predefined threshold value, the system will declare a non-match.

It is to be understood that the present description is merely an example of the principles of the present disclosure and should not be taken to be restrictive to the present disclosure and is intended for explanation and understanding purpose only. To those skilled in the art, it will obvious from the following disclosure that alternative embodiments of elements and methods illustrated can be employed without departing from the principle of the present disclosure described herein, the present disclosure being defined in the accompanying claims.

The invention claimed is:
1. A method of processing fingerprint images, comprising:
   a) processing each fingerprint image to form a processed image by:
      i) justifying the image by at least one of a translation or a rotation thereof,
      ii) partitioning the image into a particular number of regions, and
      iii) for each region of the image, measuring parameters of the respective region, and storing the parameters, wherein the parameters comprise a prevailing ridge orientation and an average ridge separation; and b) for all of the processed images, projecting the parameters for each region of the respective images into a multidimensional first coordinate system, and representing the images in the first coordinate system, wherein a representation distance between representations of corresponding parameters of two of the images is indicative of a dissimilarity of the corresponding images.

2. The method according to claim 1, wherein the parameters comprise a phase of prevailing ridges in the respective region.

3. The method according to claim 1, wherein the justifying procedure comprises:
  identifying a biological center and a biological axis of a fingerprint in the respective image,
  setting a common reference point and a common reference axis in the respective image,
  translating the respective image so that the biological center of the fingerprint is re-located at the common reference point, and
  rotating the respective image so that the biological axis of the fingerprint orientation coincides with the common reference axis.

4. The method according to claim 3, wherein, if the biological center of the associated fingerprint is not present in the respective image, an off-image location of the biological center is estimated using a combination of an extrapolation of the prevailing ridges in an on-image portion of the fingerprint and known patterns of fingerprints.

5. The method according to claim 1, further comprising applying a periodic wave function model to the respective image to simulate a particular part of the respective image in the respective region to form a model image, wherein the parameters are measured on at least one of the model image or the respective image.

6. The method according to claim 5, further comprising measuring an estimation error which is a difference between parameter measurements on the model image and on the respective image, wherein, if the estimation error in a particular region of the respective image exceeds a predetermined first threshold, then a partitioning procedure is applied to the particular region to create sub-regions thereof, and the measuring procedure is applied within the sub-regions.

7. The method according to claim 1, further comprising projection of the parameters into a second coordinate system, wherein a representation distance between representations of two of the respective images in the second coordinate system is greater than a representation distance between representations of two of the respective images in the first coordinate system.

8. The method according to claim 7, further comprising reducing dimensions of the respective image by eliminating at least one dimension from the first coordinate system in the second coordinate system.

9. The method according to claim 1, further comprising assigning a variance score to each processed one of the respective images according to the representation distance between the representations, the variance score being indicative of a dissimilarity between the representations.

10. The method according to claim 9, further comprising excluding a portion of the dimensions of the coordinate system from processing, and permitting only a non-excluded fraction K of all of the dimensions to be processed, the excluded dimensions being those the elimination of which causes a variance score to be below that of a predetermined second threshold.

11. The method according to claim 1, further comprising categorizing a set of the respective images in categories according to locations of the corresponding representations in the coordination system.

12. The method according to claim 11, further comprising, for all of the images of a particular category, determining a class template image with a mean pattern M for a class of the class template image.

13. The method according to claim 12, wherein, for each image in the particular category into a number of regions having a region size that is based on distance from a biological center of a fingerprint in the respective image.

14. The method according to claim 13, further comprising identifying a transformation of first representations of parameters of a particular image by comparing the first representations to second representations of corresponding parameters in the same regions of the class template image M, wherein a representation distance between the candidate image representations and the template image is determined to be a region transformation parameter.

15. The method according to claim 14, further comprising assigning a score to each comparison of the representations according to a degree of similarity between the representations in the regions of the candidate image regions and the representations in corresponding regions of the class template image.

16. The method according to claim 15, wherein, if the score equals or exceeds a predetermined third threshold, the transformation parameter is applied to the parameters in the associated region of the candidate image, and further comprising transforming the representations by the transformation parameter.

17. The method according to claim 16, wherein, if the score is less than a predetermined third threshold, applying a further partitioning procedure to the respective region to create sub-regions of the region and the measuring procedure is applied within the sub-regions and the comparison procedure is repeated.

18. The method according to claim 1, further comprising matching the respective imaging by comparing candidate images against stored images to identify matches.

19. An apparatus, comprising:
  a) a first arrangement which is configured to (i) justify images by at least one of a translation or a rotation of the images, and (ii) partition the images into a number of regions;
  b) a second arrangement which is configured to measure, in each region of the images, image parameters which comprise a prevailing ridge orientation and an average ridge separation of the regions;
  c) a third arrangement which is configured to store the measured parameters;
  d) a fourth arrangement which is configured to project the measured parameters for each region into a multidimensional first coordinate system; and
  e) a fifth arrangement which is configured to represent the images in the first coordinate system, wherein a representation distance between representations of corresponding parameters of two of the images being indicative of the dissimilarity of the corresponding images.

20. A computer program product, which is stored on a non-transitory computer readable storage medium containing instructions, which, when executed by a computer, configures the computer to process fingerprint images using procedures comprising:

a) processing each fingerprint image to form a processed image, the processing of each fingerprint image comprising, for each image to be processed:
  i. justifying the image by at least one of a translation or a rotation thereof,
  ii. partitioning the image into a particular number of regions, and
  iii. for each region of the image, measuring parameters of the respective region, and storing the parameters, wherein the parameters comprise a prevailing ridge orientation and an average ridge separation; and
b) for all of the processed images, projecting the parameters for each region of the respective images into a multidimensional first coordinate system, and representing the images in the first coordinate system, wherein a representation distance between representations of corresponding parameters of two of the images is indicative of a dissimilarity of the corresponding images.

\* \* \* \* \*